United States Patent [19]

Matsuda et al.

[11] Patent Number: 5,416,609
[45] Date of Patent: May 16, 1995

[54] IMAGE PICKUP APPARATUS FOR FOCUSING AN OBJECT IMAGE BASED ON MIRROR REFLECTED HEIGHT OF THE OBJECT

[75] Inventors: Shinya Matsuda, Kyoto; Shinichi Fujii, Amagasaki, both of Japan

[73] Assignee: Minolta Co., Ltd., Osaka, Japan

[21] Appl. No.: 58,574

[22] Filed: May 6, 1993

[30] Foreign Application Priority Data

May 13, 1992 [JP] Japan ................................. 4-148318

[51] Int. Cl.⁶ .............................................. H04N 1/40
[52] U.S. Cl. .................................. 358/474; 358/471; 358/486; 358/493; 250/560; 250/201.7
[58] Field of Search ............... 358/474, 471, 497, 486, 358/406, 909, 493; 250/560, 261.7, 201.6, 208.1; 377/8; 355/309, 308; 271/55, 60, 3.1; 73/1 J; 209/939; 33/707, 547

[56] References Cited

U.S. PATENT DOCUMENTS

| | | |
|---|---|---|
| 4,768,052 | 8/1988 | Hamada et al. . |
| 5,084,611 | 6/1992 | Okisu et al. . |
| 5,184,733 | 2/1993 | Arnarson et al. .................. 209/939 |
| 5,220,436 | 6/1993 | Aosaki et al. ..................... 358/474 |
| 5,221,974 | 6/1993 | Kusumoto et al. ................ 358/474 |
| 5,276,530 | 1/1994 | Siegel ............................... 358/406 |

FOREIGN PATENT DOCUMENTS

| | | |
|---|---|---|
| 50-78114 | 7/1975 | Japan . |
| 60-36905 | 2/1985 | Japan . |
| 60-254869 | 12/1985 | Japan . |
| 2272874 | 11/1990 | Japan . |

Primary Examiner—Edward L. Coles, Sr.
Assistant Examiner—Fan Lee
Attorney, Agent, or Firm—Price, Gess & Ubell

[57] ABSTRACT

An image pickup apparatus for reading an object having a curved document surface such as an opened book, constructed to focus an optical system all the object. A line sensor is moved for scanning the object, thereby a distance between the line sensor and the object is measured, and the object is imaged while controlling an optical system based on data of measured distance so that an object image is in focus on the line sensor. This allows all over the object surface to be in focus, whereby the clear image without blur is obtainable.

16 Claims, 8 Drawing Sheets

HEAD PICTURE ELEMENT

IMAGE PICKUP APPARATUS FOR FOCUSING AN OBJECT IMAGE BASED ON MIRROR REFLECTED HEIGHT OF THE OBJECT

BACKGROUND OF THE INVENTION

1. Field of the Invention

The present invention relates to an image pickup apparatus for imaging a document such as a book from above, which is provided with a mechanism to detect curvatures of document surface to perform automatic focusing.

2. Description of the Related Arts

Conventionally, there is known a camera type image pickup apparatus which substitutes an area sensor for a silver salt film. In this apparatus, within one area of an object, a lens is focused only on a main portion of the area. There is also known an apparatus in which the silver salt film is replaced by the line sensor capable of scanning movement (see, for example, Japanese Laid-Open Utility Model Publication No. 50-78114).

However, in an image pickup apparatus using an area sensor, when reading and imaging a document from above, especially in case of a document bound in book form, if a lens is controlled to be in focus on a main portion within the area of the document, other portions can be out of focus, since a paper surface is normally curved in a region adjacent a Joint of the book, wherein a height of document surface is varied. This causes a problem in that an image is blurred and that a clear image is not obtainable. The above Japanese Laid-Open Utility Model Publication No. 50-78114 discloses nothing about a focusing operation. Meanwhile, as shown in United States Patent No. 5,084,611, there is disclosed an apparatus capable of expansional processing of a picked up image in accordance with a degree to which a document is curved. However, in connection with this apparatus, there is no disclosure directed to a focusing operation.

SUMMARY OF THE INVENTION

It is an object of the present invention to provide an image pickup apparatus for reading an object such as an opened book having a curved document surface, capable of obtaining clear image without any blur, by focusing everywhere over the object surface.

In order to solve the above described problem, according to the present invention, an image pickup apparatus for imaging an object by scanning of a line sensor comprises: an imaging optical system for forming an object image on the line sensor; a scanning means for scanning the object by moving the line sensor relatively to the object; and a focus adjusting means for controlling the imaging optical system so that the object image is in focus on the line sensor during the scanning.

According to the above construction, the scanning means makes the line sensor scan the object, and the imaging optical system forms the object image on the line sensor at the same time. During this scanning, the object is imaged while controlling the imaging optical system so that the object image is in focus on the line sensor. In this way, since everywhere all over the object surface is in focus, a clear image without any blur can be obtained.

DETAILED DESCRIPTION OF THE PREFERRED EMBODIMENTS

Figure 1:
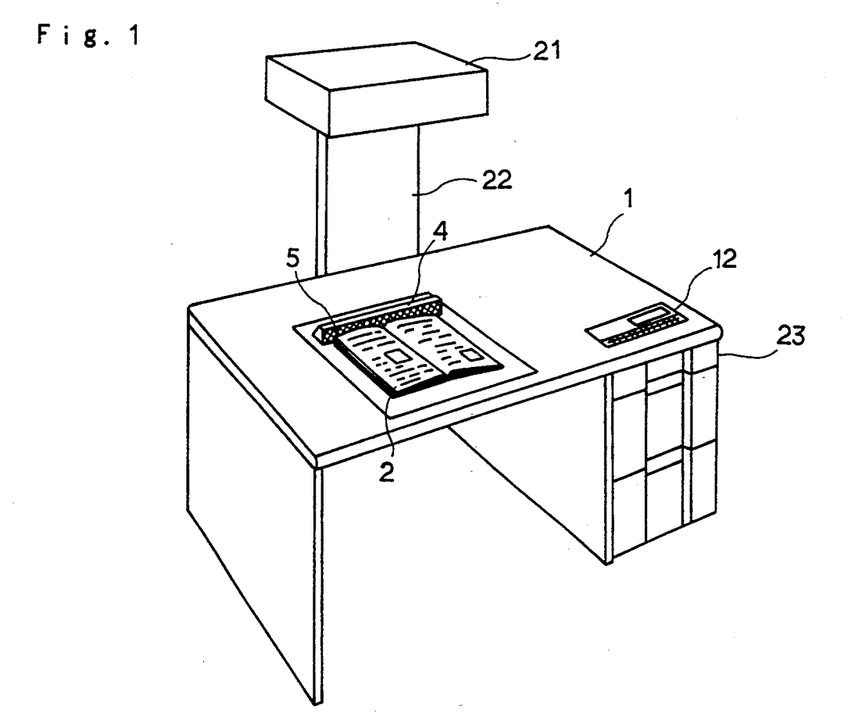
FIG. 1 is a perspective view showing an image pickup apparatus according to an embodiment of the present invention.

Preferred embodiment of the present invention will be described hereinafter with reference to the accompanying drawings. FIG. 1 shows an appearance of an image pickup apparatus. An object 2 such as books or files is placed face up on a document holder 1, and a reading unit 21 is disposed on a position for reading the object 2 from above. A support member 22 supports the reading unit 21, whereby an appropriate distance is provided between the reading unit 21 and the object 2. The distance is long enough for visual recognition of a readable area on the document holder 1, and a working space is formed therebetween. The apparatus further provides a print key 12 for giving a starting signal of an image pickup operation and a control circuit 23 which controls the apparatus.

Figure 2:
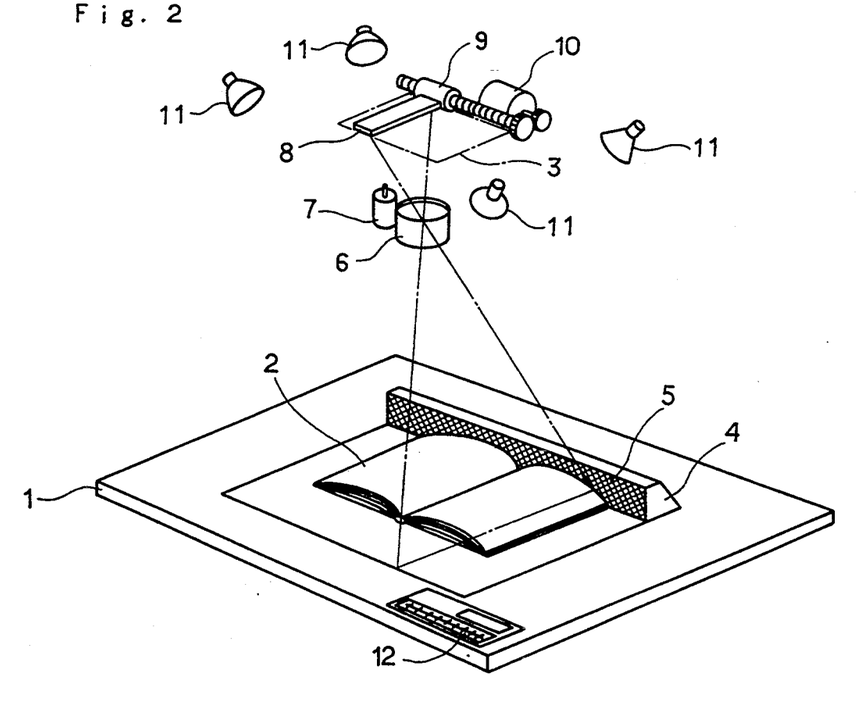
FIG. 2 is a perspective view showing a functional structure of the image pickup apparatus.

FIG. 2 is a view showing a functional structure of the image pickup apparatus. The object 2 is a curved document such as books or files, whose sheets of paper are bound at one end, and when being spread out, whose surface is distorted at each page like a column. At a rear end on a surface of the document holder 1, a stopper 4 is disposed perpendicularly to the surface and extends in longitudinal direction. The object 2 is positioned by contacting a top edge thereof to a vertical plane of the stopper 4. In order to distinguish the stopper 4 from the top edge of the object 2, a black reflecting plane 5 is disposed on the vertical side of the stopper 4 to which the object 2 is contacted. The object 2 is illuminated by lamps 11 provided over the document holder 1 from above.

A lens 6 driven by an auto-focus motor 7 is disposed in the reading unit 21, and thereby an image of the object 2 illuminated by the lamp 11 is formed on a focal plane 3, that is, a virtual surface. A line sensor 8 equipped with photoelectric conversion device and charge carrying means is arranged movable for scanning on the focal plane 3. The line sensor 8 may comprise a sensor such as charge coupled device (CCD). The line sensor 8 is so arranged that a line direction thereof becomes longitudinal direction of the document holder 1 (hereinafter referred to as main scanning direction of the sensor). A ball screw 9 and a scanner motor 10, serving as a source of driving force, are provided in order to move the line sensor 8. A nut part of the ball screw 9 engages with the line sensor 8. The ball screw 9 is rotated by the scanner motor 10, whereby the line sensor 8 moves in a lateral direction of the document holder 1 (hereinafter referred to as sub scanning direction of the sensor).

Figure 3:
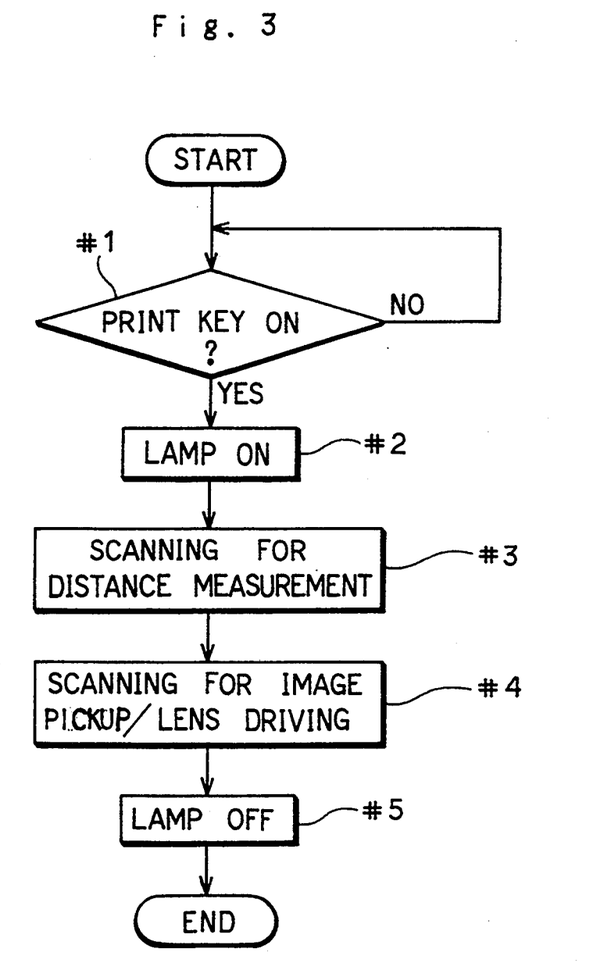
FIG. 3 is a flowchart showing an image pickup operation.
Figure 4:
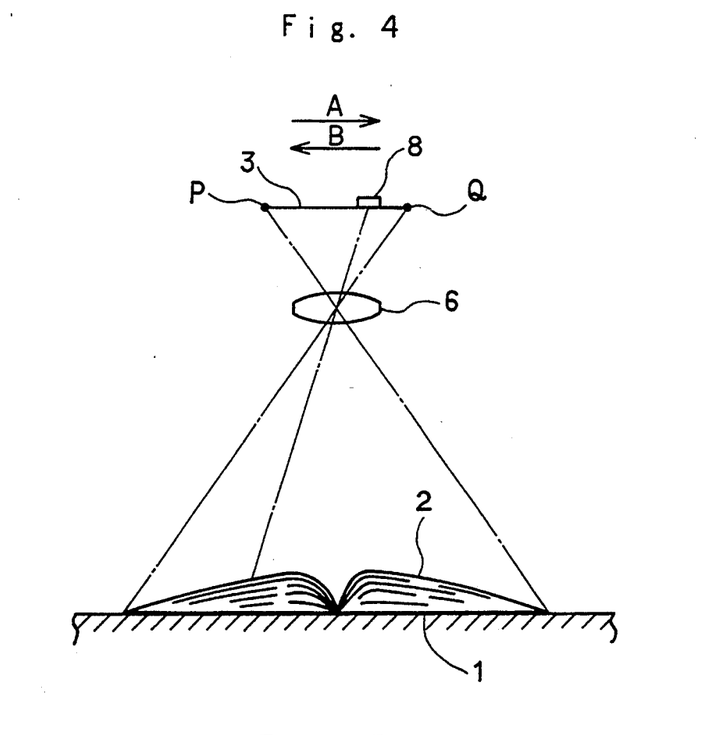
FIG. 4 is a front view showing a line sensor, a lens and an object.

An operation of the above construction will be explained hereinafter with reference to FIGS. 3 and 4. FIG. 3 is a flowchart showing an image pickup operation. FIG. 4 is a front view showing the line sensor, the lens and the object. When starting, the system waits for a print key 12 to be ON. When the print key 12 is ON (yes at #1), the lump 11 is lit (#2) and thereby the object 2 is illuminated. Thereafter, distance measuring action is carried out (#3) to measure a distance from the lens 6 to the object 2. In this action, the ball screw 9 is rotated by scanner motor 10, and thereby the line sensor 8 is moved. The line sensor 8, starting from a point P shown in FIG. 4, moves in a direction of A toward a point Q on the focal plane 3 at a constant speed. Upon reaching the point Q, the line sensor 8 starts to move on the same plane in a direction of B which is a reverse direction of A, and returns to the point P again.

Figure 5:
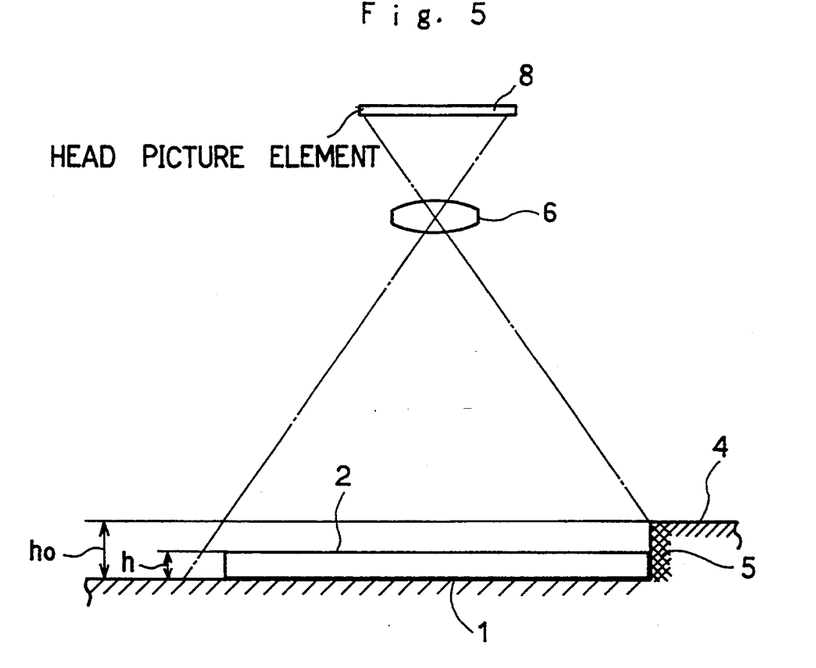
FIG. 5 is a side view showing a line sensor, a lens and an object.
Figure 6:
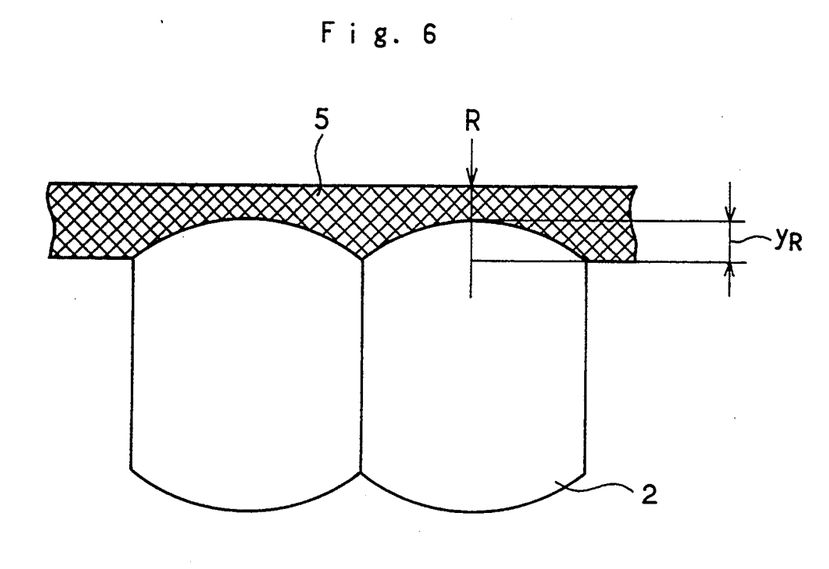
FIG. 6 is a view of an object placed on a document holder seen from above through a lens.

Nextly, a principle of the distance measuring operation will be explained with reference to FIGS. 5 and 6. FIG. 5 is a side view showing the line sensor, the lens and the object. FIG. 6 is a view of the object placed on the document holder seen from above through the lens 6. The lens 6 is fixed so that an image of the object located at h0 height from the surface of the document holder 1, as high as the stopper 4, is formed on the focal plane 3. After the line sensor 8 having moved on the focal plane 3 from the point P to the point Q shown in FIG. 4, an image data as shown in FIG. 6 is input to the line sensor 8. In FIG. 6, top and bottom edges of the object 2 are curved (and a curve degree is maximum at a point R), because an amount of change in height h of the object 2 on the document holder 1 is input to the line sensor 8 as a change amount y ($y_R$ at maximum) in the direction of main scanning of the line sensor 8.

The relation between the change of height h of the object 2 and the change amount y is obtained by an optical system which is provided by the line sensor 8, the lens 6 and the object 2. Upon reading a difference in brightness between the object 2 and the black reflecting plane 5 by the line sensor 8, the change amount y in the main scanning direction is obtained from a border position therebetween on the line sensor 8. Further, the change amount y in main scanning direction at each sub scanning position is obtained from the point P to the point Q in FIG. 4 by moving the line sensor 8 in a sub scanning direction, which permits a computing of a changing height at each lateral direction position in the rear side of the object 2. When opening the object 2, such as books and files whose sheets of paper are bound at one end, the height thereof at the top edge (far side) is approximately the same as that of bottom edge (near side). Therefore, it is enough to measure the height at either far or near side of the object 2, by using the above method.

The distance measuring operation having been completed, an imaging operation is started (#4). In this action, the object 2 is imaged by moving the line sensor 8 again from the point P to the point Q in the direction of A on the focal plane 3. During the movement of the line sensor 8, a position of the lens 6 is adjusted by the auto-focus motor 7 based on height data obtained by the above described distance measuring operation. The imaging operation having been completed, the lamp 11 is put out (#5), and the operation is finished.

Figure 7:
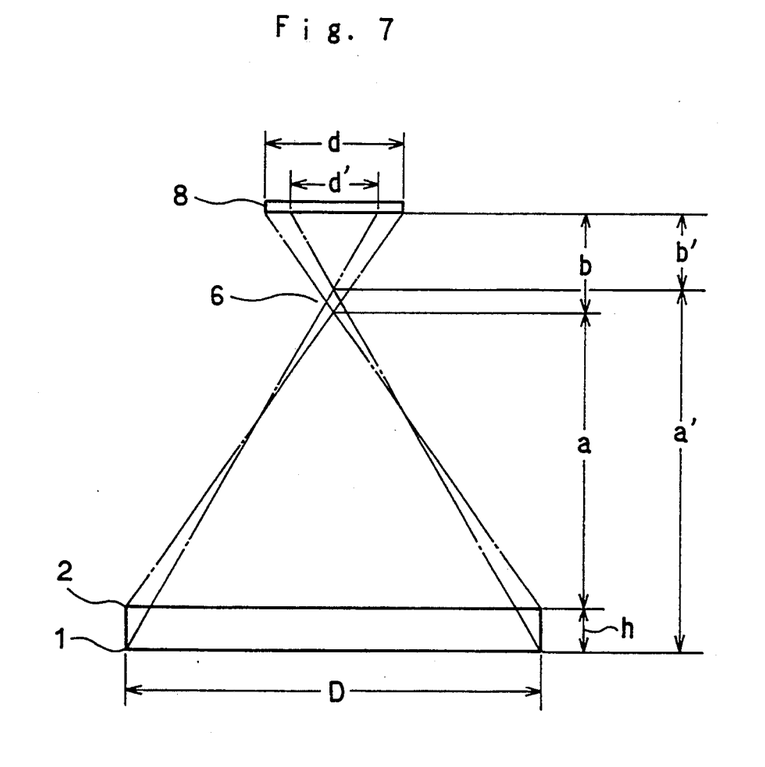
FIG. 7 is a view explaining a method of lens control.

Now, a method for controlling the lens is explained, with reference to FIG. 7. In this embodiment, a lens having single focal length is used and focusing only by moving the lens is carried out. When being in focus on the object 2 having a height of h, the respective position of the line sensor 8, the lens 6 and the object 2 is expressed by the following equation:

$$1/a + 1/b = 1/f$$

wherein
a: distance from the object 2 to the lens 6
b: distance from the lens 6 to the line sensor 8
f: focal length of the lens 6

Meanwhile, when being in focus on the surface of the document holder 1, the following relation is established:

$$1/a' + 1/b' = 1/f$$

wherein
a': distance from the object 2 to the lens 6
b': distance from the lens 6 to the line sensor 8

Here, the relation of $a + b + h = a' + b'$ is established between (a, b) and (a', b'). The lens shift amount (b-b') for focusing the object 2 having a height h is obtained by above-mentioned relations.

Figure 8:
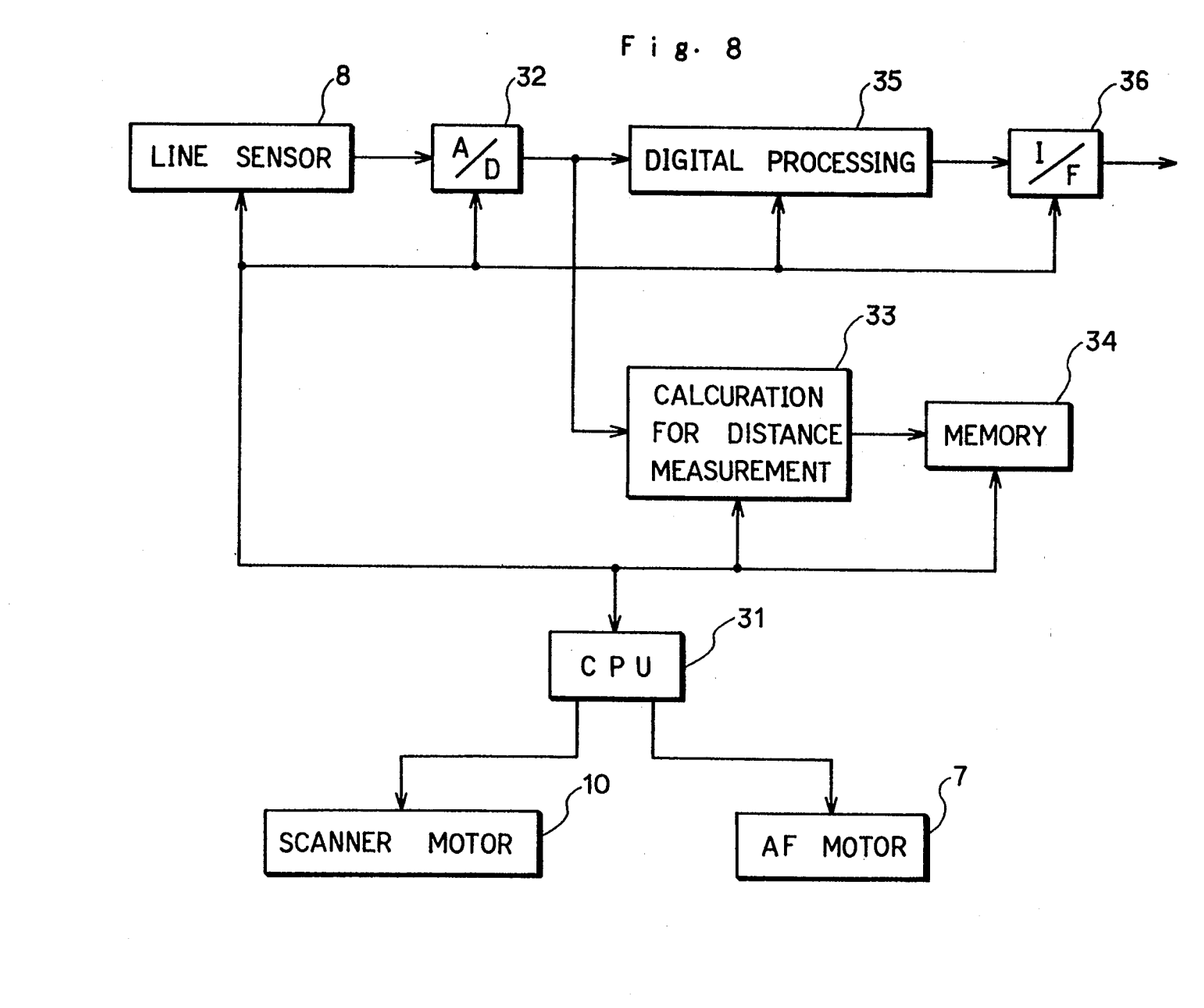
FIG. 8 is a block diagram showing a control circuit of the apparatus.

Nextly explained is a control circuit used in the apparatus, with reference to FIG. 8. CPU 31 controls the apparatus, supplying a timing pulse necessary for imaging system and controlling the scanner motor 10 and the auto-focus motor 7. The flow of signals in the imaging system is as follows. An image signal detected in the line sensor 8 is converted into a digital signal at an AD (analog to digital) conversion block 32. At the time of distance measuring operation, this digital image signal is applied to a distance measurement calculating block 33. The height data h of the object 2 is calculated therein as described above and thereafter memorized in a memory 34. The distance measurement data is memorized therein each time the line sensor 8 has been moved along one line.

Meanwhile, at the time of an imaging operation, the digital image signal converted at the AD conversion block 32, after processed at a digital signal processing block 35, is supplied to an external instrument via I/F circuit 36. At the time of this imaging operation, the CPU 31 reads the data h on the height of the object 2 from the memory 34 simultaneously with controlling the drive of the scanner motor 10. The amount of lens shift (b-b') is calculated based on the read data, and focusing is performed by controlling the drive of the auto-focus motor 7. This focusing operation is carried out each time one line is scanned by the line sensor 8. As described above, a clear image without any blur is obtainable by controlling the drive of the lens 6 so that the lens 6 is in focus corresponding to the height of the object 2 being imaged by the line sensor 8.

Nextly, referring to FIG. 7, explanation is given to the number of picture elements of the line sensor 8. The higher the height h of the object 2 is, and the longer an object distance a is, the shorter a distance b at the time of being in focus becomes. For example, when the distance a is ∞, the distance b takes a minimum value f (which stands for a focal length of the lens 6). Accordingly, the larger h becomes, a value of magnification (b/a) is bigger. Here, assuming that a length of the object 2 is D in the main scanning direction of the line sensor 8, a length d of the object image on the line sensor 8 is represented by $d = D \times (b/a)$, wherein the length d becomes longer with an increase of the height h. As described above, in case the object 2 which has a maximum value in the longitudinal direction of the document holder 1 exists at a position giving a settable maximum height, the number of picture elements of the line sensor 8 is set so as to be sufficient in the main scanning direction, and thereby this apparatus becomes available for any sort of object.

Figure 9:
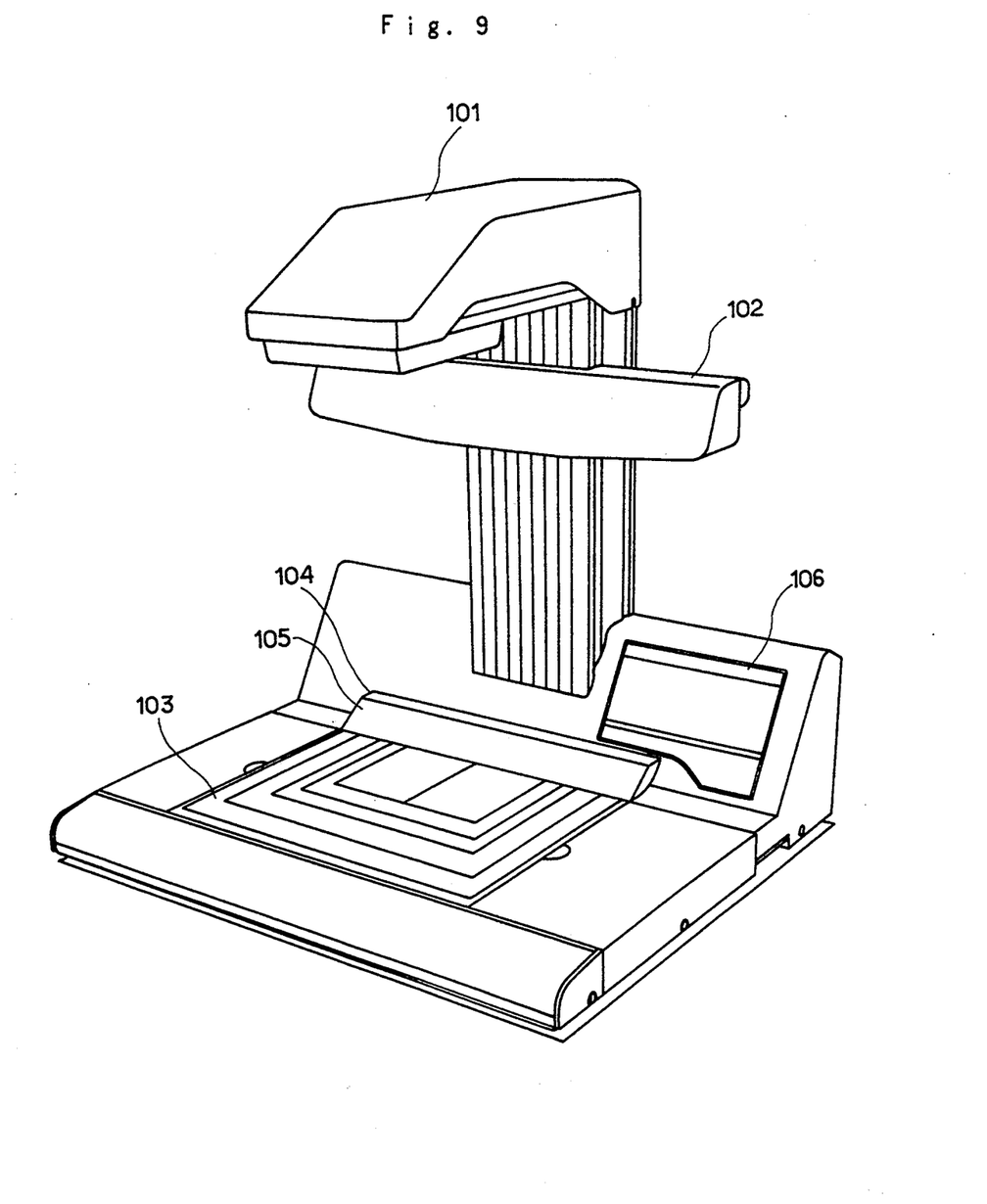
FIG. 9 is a perspective view showing an image pickup apparatus of the second embodiment.

The explanation is nextly given to the second embodiment of the image pickup apparatus according to the present invention. FIG. 9 is a perspective view showing the image pickup apparatus. A reading unit 101 is arranged for reading books or files placed on a document holder 103 from above. The reading unit 101 and the document holder 103 are spaced a predetermined distance apart from each other, and the space formed therebetween is used as a work space. The document holder 103 is painted black. A stopper 104 for positioning the document is disposed on a rear end of the document holder 103 and has a plane formed at an angle of 45° angle with respect to a plane of the document holder in its document side. The document is positioned in place in the longitudinal direction by putting a top edge of the document to a lower edge of the stopper 104. The document side plane of the stopper 104 is formed in mirror which is used for a distance measurement. A group of operational switches including a print key for giving a starting signal of image pickup operation and the like is disposed in an operational unit 106. The illuminating lamp 102 to illuminate the object is disposed above the rear end of the document holder 103. The plane at stopper side of the document is illuminated, too, both directly and by a light reflected by the mirror 105 on the stopper 104. The construction of the reading section 101 composed of a lens, an auto-focus motor and a line sensor and the like is the same as that of the first embodiment, and the explanation thereof is omitted here.

Then, a principle of distance measuring operation is explained hereinafter referring to FIGS. 10, 11 and 12.

Figure 10:
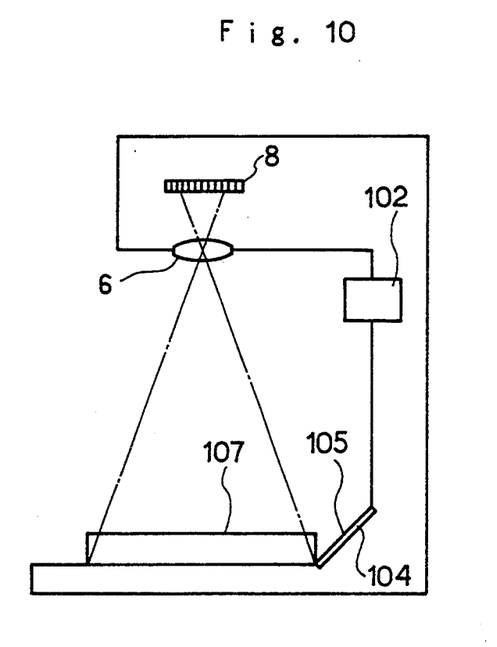
FIG. 10 is a side view showing a line sensor, a lens and a document.

FIG. 10 is a side view of the line sensor, the lens and the document. As described above, a document 107 is positioned by the lower edge of a stopper 104. The document 107 is illuminated by the lamp 102 disposed above the rear end of a document holder 103, then, a mirror image of the document 107 is formed as shown in FIG. 11 since the stopper 104 is disposed at 45° angle to the document holder 103.

Figure 11:
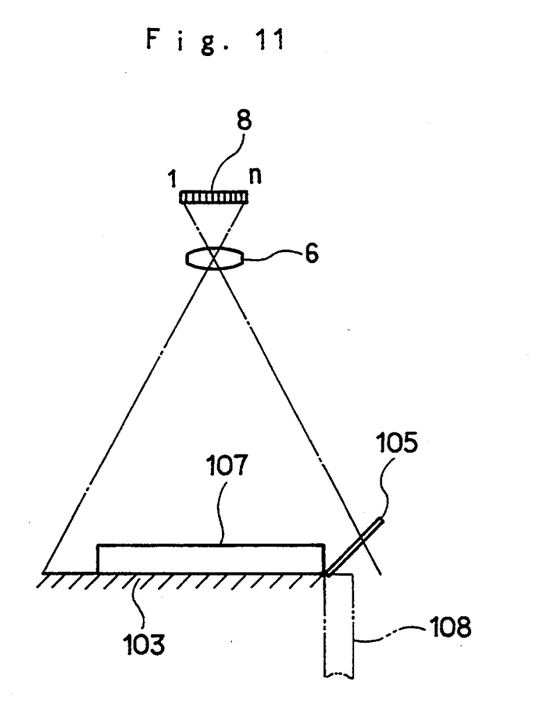
FIG. 11 is a side view explaining a mirror image of the document.
Figure 12:
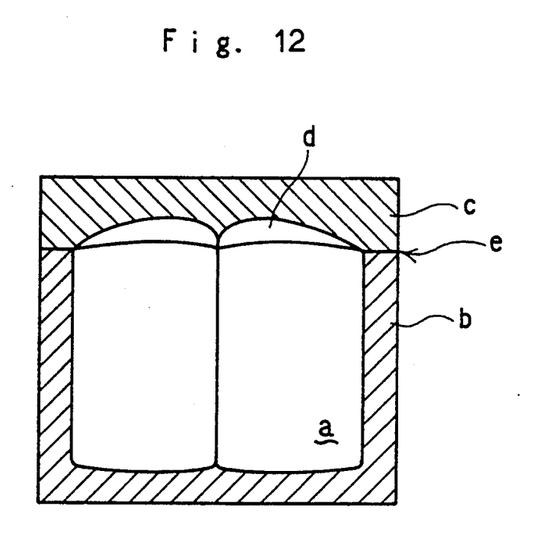
FIG. 12 is a view showing an image picked up by a line sensor through a lens.

FIG. 12 shows an image read by the line sensor 8 through the lens 6 in the condition shown in FIG. 11. An image d of a document edge is reflected by the mirror 105 and formed successively on an extension from an edge line e of a document holder image b. Since the document 107 and the document edge are illuminated by the lamp 102, the images a and d thereof read by the line sensor are white as a whole. On the other hand, since the document holder 103 is painted black and no light is incident on a portion of the mirror 105 in which an image of the document edge is not reflected. Consequently, the read images thereof, b and c, are both black.

Figure 13:
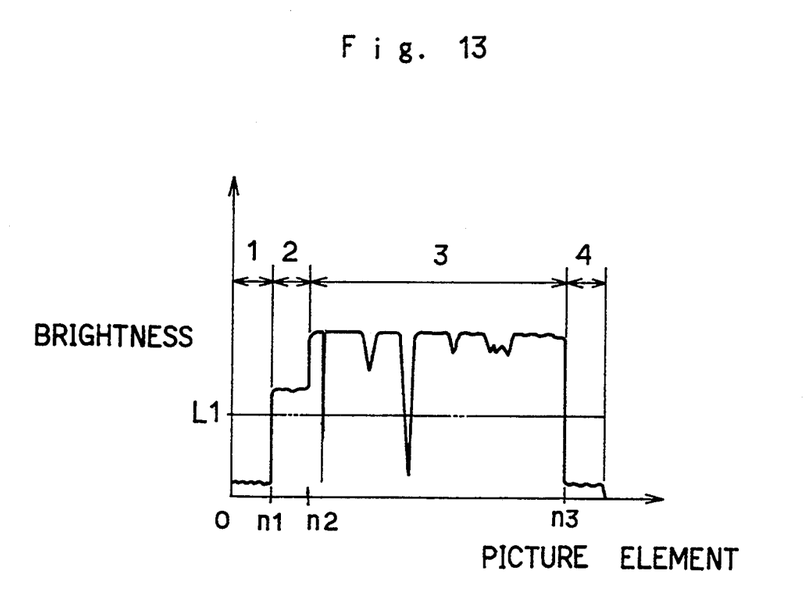
FIG. 13 is a view showing an example of an output from the line sensor as much as 1 line In a main scanning direction.

FIG. 13 is a graph showing an example of an output as much as 1 line of the line sensor in main scanning direction. The horizontal axis indicates the picture elements number of the line sensor (left:rear side, right:-front side), and the vertical axis indicates a brightness of the object. In this graph, numeral 1 is a portion in which the document edge is not reflected on the mirror 105, numeral 2 is a region in which the document edge is reflected on the mirror 105, numeral 3 is a region corresponding to the document 107 and numeral 4 is a region corresponding to the document holder 103. An output from the line sensor 8 at the regions 1 and 4 is less than a brightness threshold value L1, since being read as black, while that of the document region 3 and the document edge region 2 exceeds the brightness threshold value L1, since being read as white as a whole. Here, assuming that n1 and n3 are respectively minimum and maximum value of the picture elements when the sensor output crosses the brightness threshold value, n2-n1 becomes the number of picture elements corresponding to the document height, since the number of picture elements n2 corresponding to a standard position of the document is fixed. Also, n3-n2-α corresponds to a document length in longitudinal direction, wherein α is calculated by aforesaid n2-n1.

An imaging operation, a process of lens control or the like, are the same as those of the first embodiment. Accordingly, explanation thereof is omitted here.

It is to be noted that the present invention is not restrictive within above described embodiments and modifications and variations can be effected as described hereinafter. For example, although imaging operation is performed after distance measuring operation in the foregoing embodiments, it may be possible to perform distance measurement and focusing operation at the same time during imaging operation. As for a focusing operation, which is effected with the use of a lens having single focal length only by moving the lens in the described embodiments, there are other possible methods such as using a zoom lens to rectify magnification in main scanning direction at the same time with focusing operation, or moving both lens and sensor incorporatively to rectify the magnification in the main scanning direction at the same time with focusing operation. The rectification of magnification is attainable by combining with digital variable magnification, though not described in the above embodiments. Further, it is possible to perform distance measuring and focusing operation at every several lines, though performed in the above embodiments each time the line sensor moves from one line to another. For distance measurement and focusing, one identical line sensor is used in the above embodiments. However, it is possible to provide two different line sensors, one for distance measurement and the other for focusing operation. Furthermore, other methods such as a triangular distance measuring may be applicable for distance measurement.

What is claimed is:

1. An image pickup apparatus comprising:
   a sensor;
   a table on which an object is placed;

an optical system for forming an object image on the sensor, wherein the object image concerns only a top view of the object a mirror member disposed on the side of the object;

measuring means for measuring a height of the object based on a side view image of the object reflected in the mirror member; and focusing means for focusing the optical system based on a measurement result by the measuring means so that the top view image is in focus on the sensor.

2. An image pickup apparatus as claimed in claim 1, wherein the optical system varies a focal length.

3. An image pickup apparatus as claimed in claim 2, further comprising rectifying means for rectifying image data outputted from the sensor with digital variable magnification.

4. An image pickup apparatus as claimed in claim 3, wherein the rectifying means rectifies the image data based on the variation of the focal length.

5. An image pickup apparatus as claimed in claim 3, wherein the rectifying means rectifies the image data based on the variation of the focal length and distance from the sensor to the object.

6. An image pickup apparatus as claimed in claim 1, wherein the distance from the sensor to the table is constant.

7. An image pickup apparatus as claimed in claim 1, wherein the optical system includes a zoom lens.

8. An image pickup apparatus comprising:

a sensor;

an optical system for forming a top view image of an object on the sensor;

taking means for taking an object edge information from an object image projected to a side direction;

measuring means for measuring a height of the object based on the object edge information; and focusing means for focusing of the top view image based on the measuring result which is the object edge information.

9. An image pickup apparatus as claimed in claim 8, wherein the optical system varies a focal length.

10. An image pickup apparatus as claimed in claim 9, further comprising rectifying means for rectifying image date outputted from the sensor with digital variable magnification.

11. An image pickup apparatus as claimed in claim 10, wherein the rectifying means rectifies the image data based on the variation of the focal length.

12. An image pickup apparatus as claimed in claim 10, wherein the rectifying means rectifies the image data based on the variation of the focal length and distance from the sensor to the object.

13. An image pickup apparatus as claimed in claim 8, wherein the optical system includes a zoom lens.

14. An image pickup apparatus as claimed in claim 8, further comprising rectifying means for rectifying image data outputted from the sensor with digital variable magnification.

15. An image pickup apparatus comprising:

a line sensor;

an optical system for forming an object image on the line sensor;

scanning means for scanning the object by moving the line sensor relatively to the object;

distance measuring means for measuring a distance to the object at plural points along a scanning direction of the scanning means by judging a position on the line sensor on which an image of the object edge is formed based on the difference in brightness between the object image and a background image thereof formed on the line sensor; and focusing means for focusing the optical system based on the measurement result of the distance measuring means so that the object image is in focus on the line sensor.

16. An image pickup apparatus for enabling a reproduction of an image of an object on a curved surface, such as an open book, comprising:

a line sensor having a plurality of photoelectric conversion devices disposed linearly;

a support surface on which the object is placed;

an optical system for forming an image of the object placed on the support surface to the line sensor;

scanning means for scanning the object by moving the line sensor relative to the object;

measuring means for measuring a height of the object placed on the support surface at plural points along a scanning direction of the scanning means by judging a position on the line sensor on which an image of the object edge is formed based on a difference in brightness between the object image and the support surface image formed on the line sensor; and control means, effective for changing a relative positional relationship among the line sensor, the optical system and the object based on the measurement result of the measuring means so that the object image is in focus on the line sensor during scanning by the scanning means.

* * * * *